US006851950B1

(12) United States Patent
Gamnig

(10) Patent No.: US 6,851,950 B1
(45) Date of Patent: Feb. 8, 2005

(54) COMPUTER SIMULATION CONTROL FRAME

(76) Inventor: Kurt Gamnig, 28051 Chapulin, Mission Viejo, CA (US) 92692

( * ) Notice: Subject to any disclaimer, the term of this patent is extended or adjusted under 35 U.S.C. 154(b) by 0 days.

(21) Appl. No.: 10/761,052

(22) Filed: Jan. 20, 2004

(51) Int. Cl.[7] ................................................ G09B 9/08
(52) U.S. Cl. .......................................... 434/45; 434/30
(58) Field of Search .............................. 434/29–31, 34, 434/35, 45, 46, 61, 62; 472/130; 312/194, 240; 297/217.7

(56) References Cited

U.S. PATENT DOCUMENTS

| 4,386,914 A | * | 6/1983 | Dustman | 434/32 |
| 4,599,070 A | * | 7/1986 | Hladky et al. | 434/45 |
| 4,659,313 A | * | 4/1987 | Kuster et al. | 434/45 |
| 4,713,007 A | | 12/1987 | Alban | |
| 5,009,598 A | * | 4/1991 | Bennington | 434/30 |
| 5,158,459 A | | 10/1992 | Edelberg | |
| 5,320,313 A | | 6/1994 | Crowe | |
| 5,409,307 A | | 4/1995 | Forsythe | |
| 5,823,876 A | | 10/1998 | Unbehand | |
| 6,688,627 B1 | * | 2/2004 | Strange | 280/278 |

* cited by examiner

*Primary Examiner*—Kurt Fernstrom

(57) ABSTRACT

A control frame for accommodating various control devices in different aircraft cockpit and vehicle configurations used with computer flight simulation programs and diverse games. The control frame allows realistic placement of control devices, simulating different cockpit configurations consistent with actual aircraft types and vehicles. Ergonomic consideration in the design reduces fatigue. The modular properties enable a quick change of the configurations. Stable mounting of device controllers and to fix in place a common computer/office chair will optimize control performance. The light, sturdy and small apparatus enables ease of handling and storage.

19 Claims, 10 Drawing Sheets

COMPUTER SIMULATION CONTROL FRAME

BACKGROUND OF THE INVENTION

The invention relates to the field of home computers and accessories for support of control hardware utilized in flight simulation programs and various games.

BACKGROUND OF THE INVENTION

When using simulation input devices, I found the operation of such devices not precise and realistic. The lack of steady and proper positioning of devices is detrimental to control performance. In addition, an unsteady seat position makes the manipulation of controls difficult.

Originally the computer keyboard was used for data inputs. This method, while possible, is slow and not realistic. The popularity of simulation and game software created a market for appropriate control devices. While expensive flight simulators are optimum in realism, they are not generic. They are out of reach to individuals for reasons of size, complexity and cost. There are a variety of home computer simulation devices on the market now. Initially they were analog, and now they are digital signal controllers. The controllers available include joysticks, yokes, steering wheels, throttles, rudder pedals, and vehicle pedals. Some of them are realistic and of high quality. The problem is the proper placement and fastening for a particular simulation. In addition, different aircraft have a variety of control configurations. The use of a simple joystick might be sufficient for a simple game. The use of a set of controls is desirable for a more realistic flight simulation. The differences in control configurations include types of controllers and their placement. Transport category aircraft have mostly yokes, while some of the newer fly-by-wire designs have side stick controllers. A throttle control or quadrant is located on a center pedestal. Consequently the control relationship between the left and right pilot station is reversed. Fighter aircraft have a joystick in the center or right side. The throttle control is placed on the left side. Small aircraft have also various control configurations.

Some devices have been developed to enhance the realism of the flight simulation. The "Aircraft Controls Simulator," U.S. Pat. No. 4,713,007 to Albans (1987) shows a cabinet containing a control yoke and a throttle placed on a table. A second cabinet, containing rudder pedals is placed on the floor. While this is a good basic yoke control set-up, it isn't ergonomically optimized. The "Freestanding Integrated Control Stick, Rudder Pedals and Throttle for Computerized Aircraft Flight Simulation Program," U.S. Pat. No. 5,158,459 to Edelberg (1992) feature the following: Two joysticks are rigged to duplicate the function of a control stick, a throttle, and a rudder. It simulates a stick configuration, and the benefits are diminished for today's available control devices. Also current stick controllers have integrated control buttons, not accessible in such a configuration. The "Pivoting Joystick and Keyboard Support Stand," U.S. Pat. No. 5,320,313 to Crowe (1994), shows a pivoting joystick platform. Due to its high mounting on a desk, the ergonomic feature is not fully realized. The "Combined Computer and Vehicle Simulator Cockpit Desk and Method Thereof," U.S. Pat. No. 5,409,307 to Forsythe (1995), integrates a desk with a cockpit. The configuration shows a left hand throttle, a center joystick, and the use of rudder pedals on the floor. This is a useful solution, however the versatility is limited. The "Steering Wheel Simulation Assembly," U.S. Pat. No. 5,823,876 granted to Unbehand (1998) shows a force feel control device. The illustration however shows a control stand, with a vehicle control arrangement.

The advantages of the Computer Simulation Control Frame are:

(a) to support compatibility with various control devices for flight simulation programs and diverse games;

(b) to provide a modular platform to enable different control configurations consistent with aircraft types and vehicles;

(c) to provide a stable mounting of control devices to optimize control performance;

(d) to provide a user ergonomic position in respect to control devices and monitor, and to minimize fatigue;

(e) to provide for means to change the configuration in a quick manner;

(f) to incorporate an adjustable pedal platform to accommodate diverse users;

(g) to provide a forward angled center stick platform to provide clearance for the legs and a better joystick interface in the center stick configuration;

(h) to provide for a graphic user interface pointing device (mouse) platform;

(i) to provide a table for navigation charts;

(j) to use a common rolling computer/office chair in a fixed position for better control performance;

(k) to prevent the swiveling action of a common rolling computer/office chair for better control performance;

(l) to provide for a light, sturdy and small apparatus, for ease of handling and storage;

(m) to provide for features in an economical manner.

The object of the Computer Simulation Control Frame, or CSCF is to support various input devices for aircraft and vehicle simulation. Additional objects are ergonomic and modular properties, to enable various more realistic control configurations. Further objects will become apparent from a consideration of the ensuing description and drawings.

DETAILED DESCRIPTION OF THE INVENTION

Figure 1:
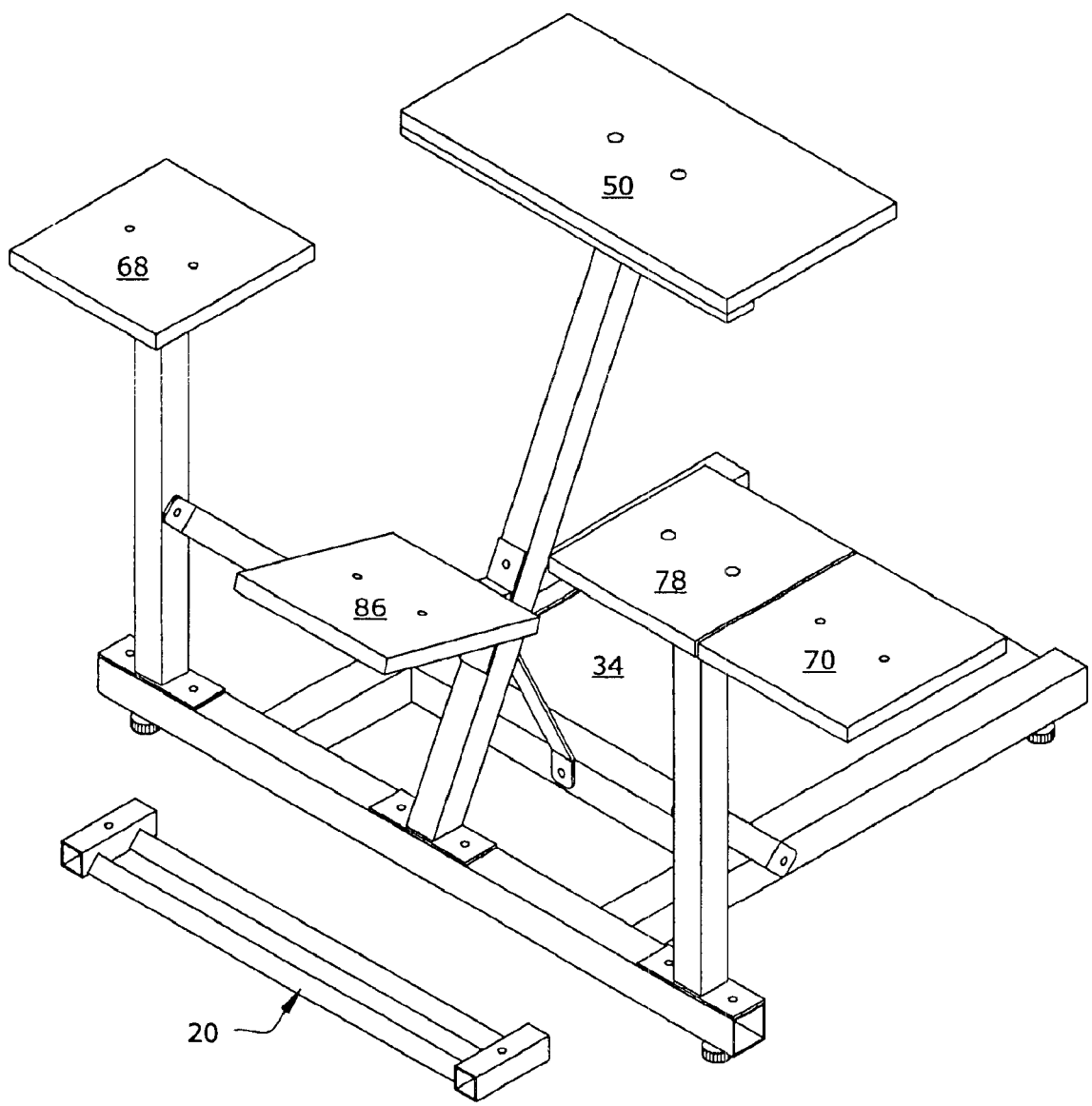
FIG. 1 shows a perspective view of the entire CSCF.

An overall view of the entire CSCF is illustrated in FIG. 1 showing the different platforms available for control devices. The number 34 shows a pedals platform. A center platform is marked with the number 50. A left side platform is shown with the number 68. A right side platform is designated with the number 70. A GUI pointing device platform (mouse) is 78. A center stick platform is shown with the number 86. The number 20 shows a seat chock assembly to fix in place a rolling computer/office chair.

Figure 2:
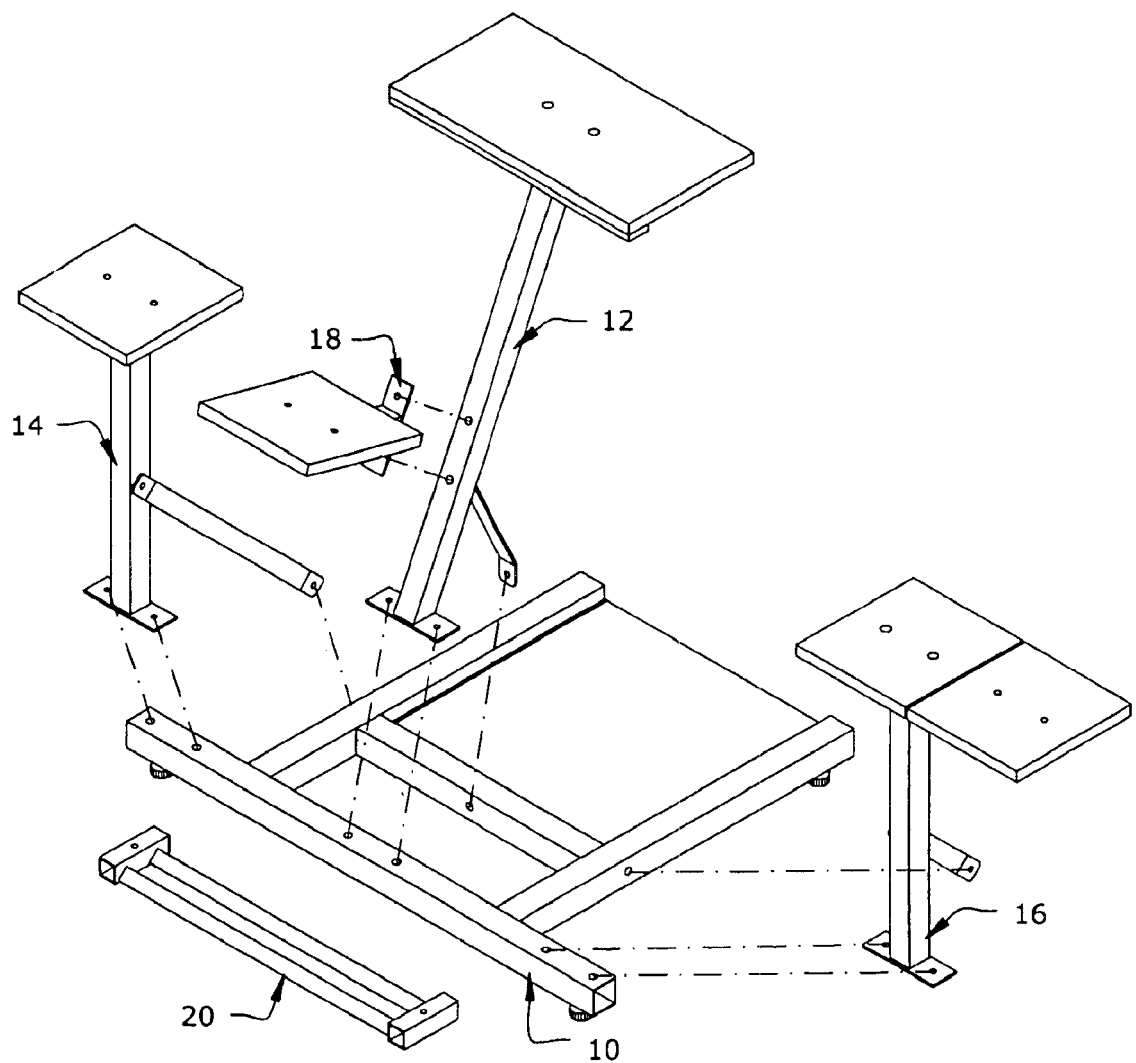
FIG. 2 shows a perspective exploded view of the assemblies.

FIG. 2 illustrates the modular design of the CSCF. A base assembly is designated with the number 10. The number 12 shows a center support assembly. A left side support assembly is marked with the number 14. Number 16 denotes the right side support assembly. A center stick support assembly is indicated by the number 18 and can be mounted on the center support assembly 12. Number 20 shows the seat chock assembly for use with a rolling chair.

Figure 3:
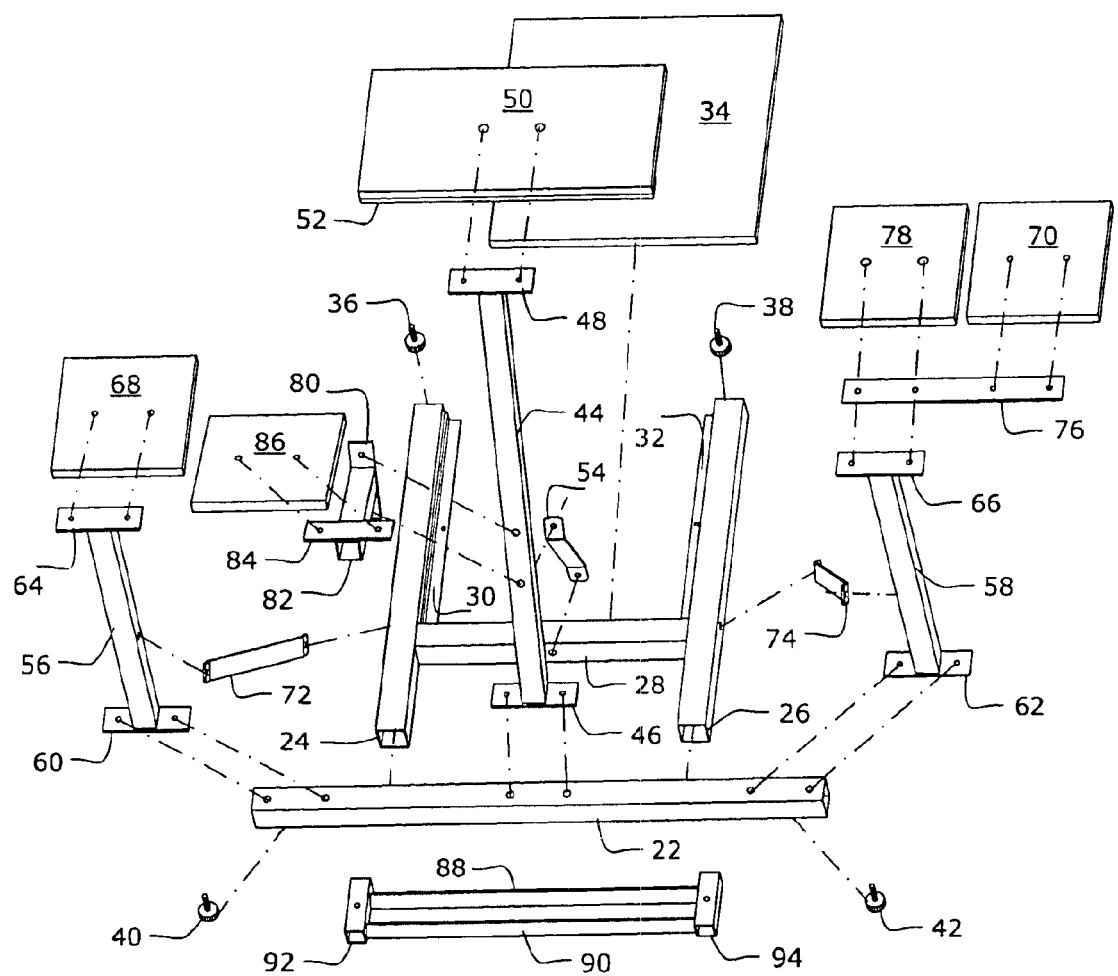
FIG. 3 shows a perspective exploded view of the entire CSCF.
Figure 9A:
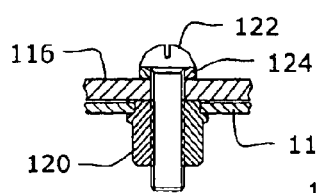
FIG. 9A shows a sectional view of the fastening detail using a rivet-nut.
Figure 9B:
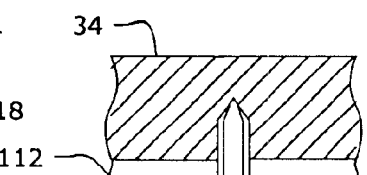
FIG. 9B shows a sectional view of the fastening of the pedals platform.
Figure 9C:
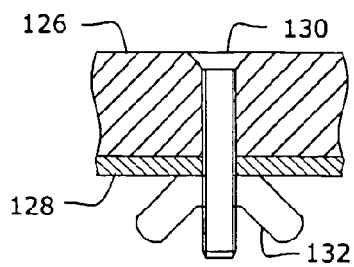
FIG. 9C shows a sectional view of the fastening detail using a counter-sunk screw and a wing nut.
Figure 9D:
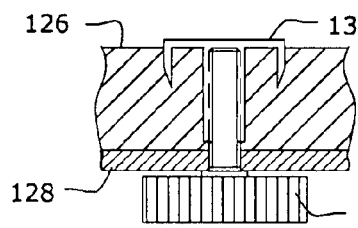
FIG. 9D shows a sectional view of the fastening detail using a T-nut and knob screw.
Figure 9E:
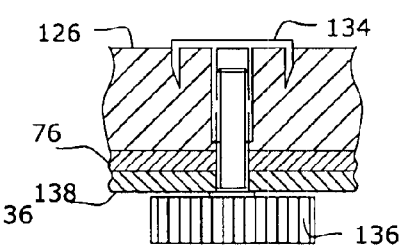
FIG. 9E shows a sectional view of the fastening detail with the auxiliary support using a T-nut and knob screw.
Figure 9F:
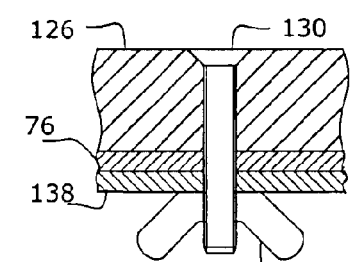
FIG. 9F shows a sectional view of the fastening detail with the auxiliary support using a counter-sunk screw and a wing nut.
Figure 9G:
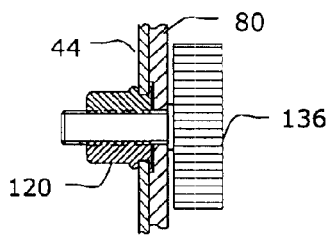
FIG. 9G shows a sectional view of the fastening detail using a rivet-nut and screw knob.

The exploded view in FIG. 3 shows the individual parts and their relationship with each other. The platforms are made of particleboard, however other materials could be used. They are attached as shown in detail FIGS. 9B, 9C, 9D, 9E and 9F. The remainder of the structure is made of steel but other materials such as aluminum and others are suitable. Rivet nuts are used on the metal tubing for fastening as shown in FIG. 9A and FIG. 9G. Some parts are welded together. Different means of joining and fastening are possible on the entire structure.

The base assembly 10 identified in FIG. 2 is described with reference to FIG. 3. A base cross member 22, a left base beam 24, a right base beam 26 and a center support beam 28 made of square tubing are welded together. A left pedals platform rail 30 is welded to the left base beam 24. A right pedals platform rail 32 is welded to the right base beam 26. The pedal platform rails are made of an angle extrusion and each have a hole for fastening. The pedal platform 34 has multiple holes for position adjustment on the platform rails and is attached with reference to FIG. 9B. A left forward leveling glide 36 is installed on the left base beam 24. A right forward leveling glide 38 is installed on the right base beam 26. A left aft leveling glide 40 and a right aft leveling glide 42 are installed on the base cross member 22.

The center support assembly 12 identified in FIG. 2 is described with reference to FIG. 3. The center platform 50 has a center platform fillet 52 glued to it on the underside. Said center platform 50 is mounted on a center platform flange 48 as shown in detail FIG. 9C. The center platform flange 48, made of a flat extrusion is welded to a center post 44. The center post 44 made of square tubing is at an angle to the vertical and is welded to a center post flange 46. The center post flange 46 is made of a flat extrusion and is attached to the base cross member 22 shown in detail FIG. 9A. A center post brace 54 made of a flat extrusion is fastened to the center post 44 and the center support beam 28 shown in detail FIG. 9A.

The left side support assembly 14 identified in FIG. 2 is described with reference to FIG. 3. The left side platform 68 is mounted to a left side post platform flange 64 as shown in detail FIG. 9D. The left side post platform flange 64 made of a flat extrusion is welded to a left side post 56. The left side post 56 is made of square tubing and is welded to a left side post flange 60. The left side post flange 60 is made of a flat extrusion and is attached to the base cross member 22 as shown in detail FIG. 9A. A left side post brace 72 made of a flat extrusion is fastened to the left side post 56 and the left base beam 24 as shown in detail FIG. 9A.

The right side support assembly 16 identified in FIG. 2 is described with reference to FIG. 3. The right side platform 70 is mounted to an auxiliary support 76 as shown in detail FIG. 9D. The auxiliary support 76 is made of a flat extrusion. The GUI pointing device platform 78 is mounted to a right side post platform flange 66 with the auxiliary support 76 inserted in between. The mounting is illustrated in detail FIG. 9F. Said right post platform flange 66 is welded to a right side post 58. The right side post 58 is made of square tubing and is welded to a right side post flange 62. The right side post flange 62 is made of a flat extrusion and is attached to the base cross member 22 as shown in detail FIG. 9A. A right side post brace 74 made of a flat extrusion is fastened to the right side post 58 and the right base beam 26 as shown in detail FIG. 9A.

The center stick support assembly 18 identified in FIG. 2 is described with reference to FIG. 3. The center stick platform 86 is mounted to a center stick platform flange 84 as shown in detail FIG. 9D. The center stick platform flange 84 is made of a flat extrusion welded to a center stick support 82. The center stick support 82 is welded to a center stick support flange 80. To insure stability with two fastening screws, the center stick support flange 80 has the holes counter-bored to create a flush mating surface with the protrusions of the rivet nuts installed on the center post 44. The mounting detail of the center stick support flange 80 to the center post 44 is shown in detail 9G.

The seat chock assembly 20 identified in FIG. 2 is described with reference to FIG. 3. A seat forward chock 88 made of an angle extrusion is welded to a left chock brace 92 and a right chock brace 94. The left chock brace 92 and the right chock brace 94 are made of square tubing and each have an anchor hole. A seat aft chock 90 made of an angle extrusion is welded to the left chock brace 92 and the right chock braces 94.

Figure 9H:
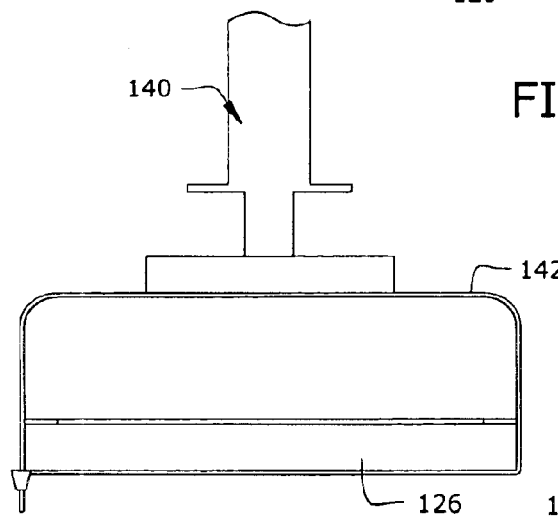
FIG. 9H shows an elevation view showing the mounting detail of a controller device with a nylon-cable-tie.
Figure 9I:
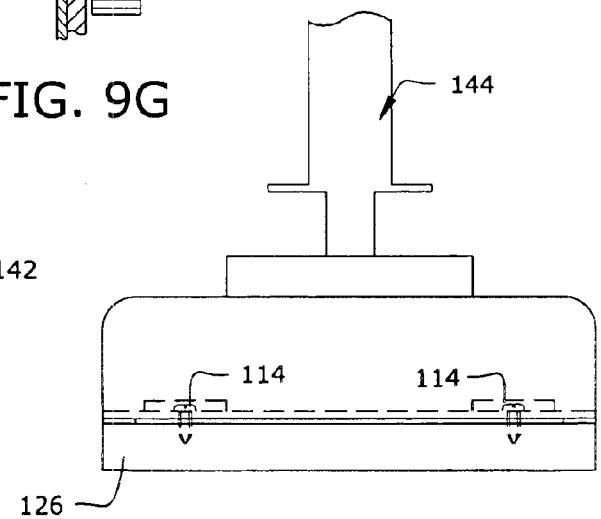
FIG. 9I shows an elevation view of the mounting detail of a controller device having fastening slots.

The CSCF is placed before a computer desk with a computer monitor, or a video screen. The modular design allows for different control configuration consistent with layouts of various aircraft models. If mounting of device controllers is not feasible as shown in FIG. 9H or FIG. 9I, hoop and loop fasteners can be used. It is highly recommended to use a chair with armrests to optimize control performance. The following describes the usage of the various control configurations referring to the different drawings.

Figure 4:
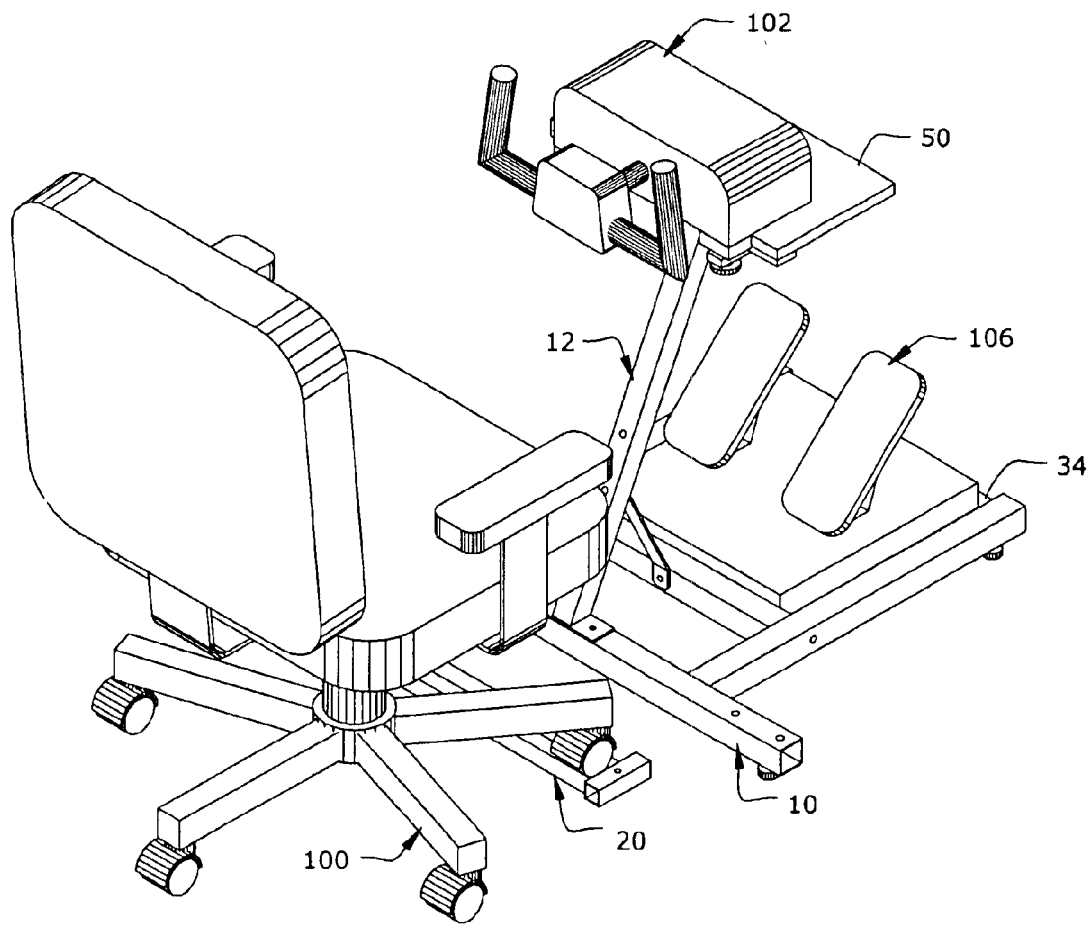
FIG. 4 shows a perspective view of a basic yoke configuration.
Figure 5:
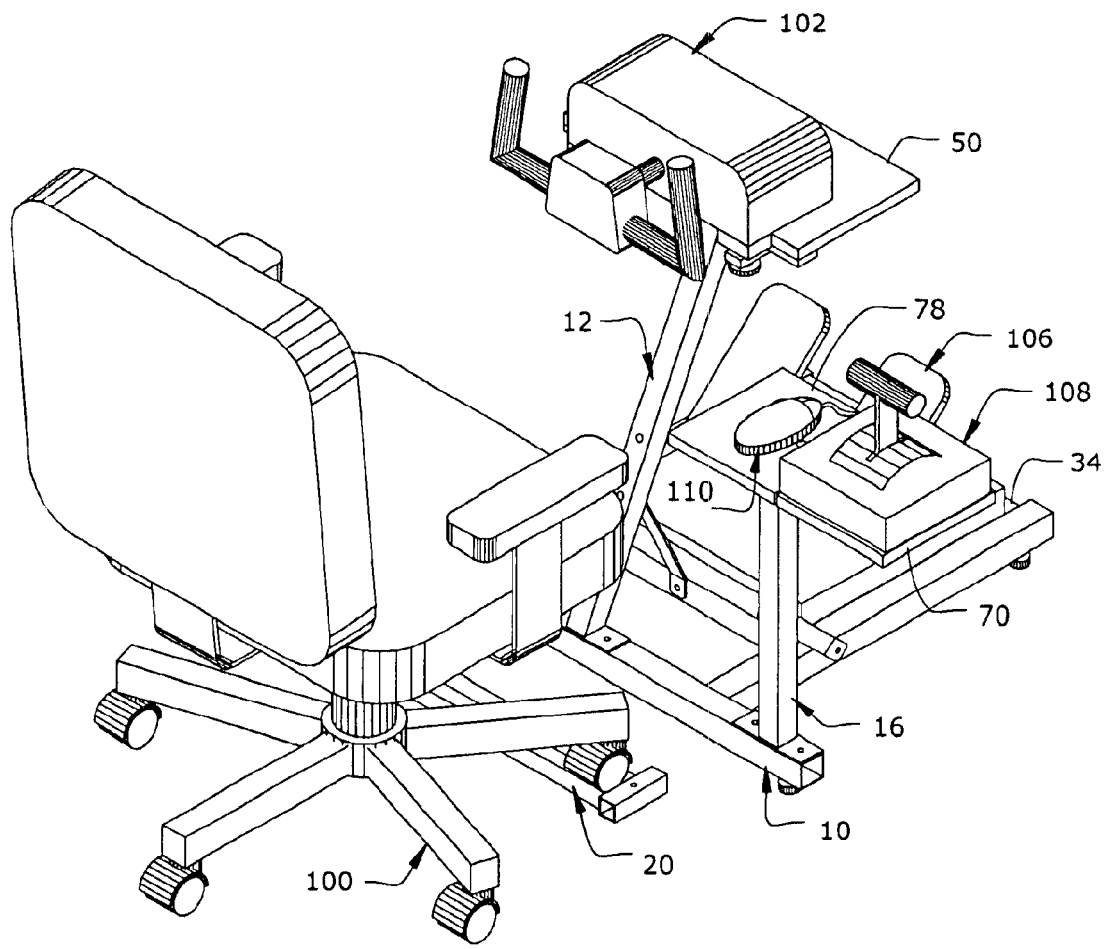
FIG. 5 shows a perspective view of a traditional transport category aircraft configuration.
Figure 9J:
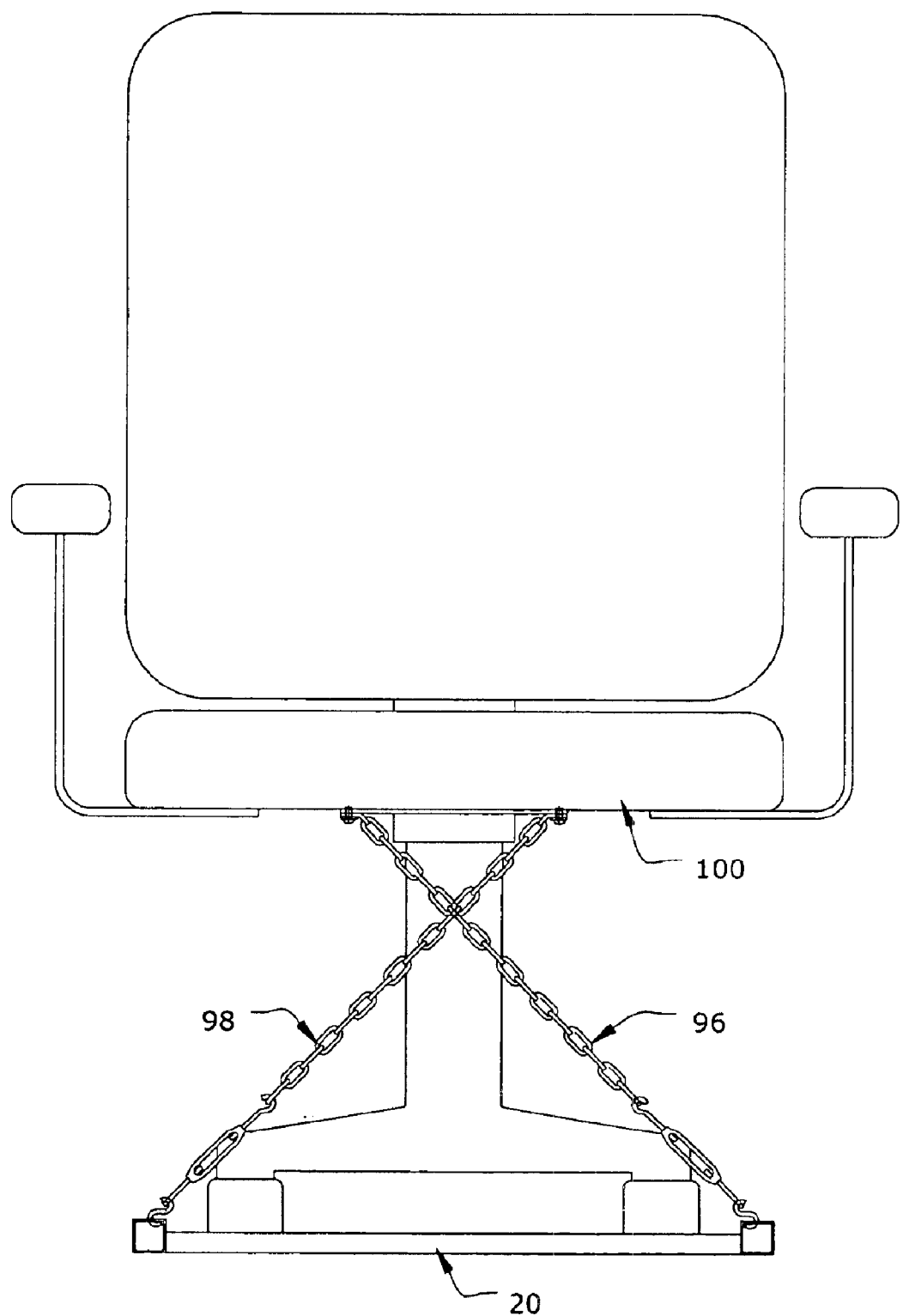
FIG. 9J shows an elevation view seen from the front, illustrating the fastening of the seat chock assembly.

The basic yoke configuration is described with reference to FIG. 4. This configuration is used on a typical light aircraft with a yoke, having an integrated throttle. The center support assembly 12 is fastened to the base assembly 10 as shown in FIG. 9A. A yoke controller 102 is mounted on the center platform 50 by clamps. A rudder pedals controller 106 is placed on the pedals platform 34. The surface texture of the pedals platform 34 provides stability of the rudder pedals controller 106 without fastening. If desired, a hook and loop fastener or other means can be utilized. Any leg adjustment is accomplished by moving the rudder pedals controller 106 on the pedals platform 34. In addition the pedal platform 34 is movable on the left pedal platform rail 30 and the right pedal platform rail 32. The pedal platform 34 is fastened as shown in FIG. 9B. To simulate a vehicle, a steering wheel and foot pedals can be used instead of the yoke controller 102 and the rudder pedal controller 106. If a rolling computer/office chair is used, the chair 100 is placed on the seat chock assembly 20. This prevents the chair 100 from rolling and provides for the seat adjustment. An additional feature for chairs without a swivel lock provides for stabilization by fastening as shown in FIG. 9J The traditional transport aircraft configuration is described with reference to FIG. 5. This configuration is common on airline and corporate jet aircraft. The center support assembly 12 is installed on the base assembly 10 as shown in FIG. 9A. The yoke controller 102 is mounted on the center platform 50 and the rudder pedals controller 106 is placed on the pedals platform 34 as mentioned in the description of FIG. 4. In addition the right side support assembly 16 is fastened to the base assembly 10 as shown in FIG. 9A. A GUI pointing device 110 is placed on the GUI pointing device platform 78 for data inputs. This approximates the position of flight management interfaces and radio controls in actual aircraft. The GUI platform 78 is mounted for quick change as shown in FIG. 9F. A throttle controller 108 is placed on the right side platform 70 and fastened with the mounting options shown in FIG. 9H or 9I. The increased offset of the throttle is common in large aircraft. The right side platform 70 is mounted for quick change as shown in FIG. 9D. The right side support assembly 16, the GUI pointing device 110 and the throttle controller 108 can be placed mirror reversed on the left hand side to simulate operation from the right seat position. If necessary, the chair 100 is placed in the seat chock assembly 20 as mentioned in the description of FIG. 4.

Figure 6:
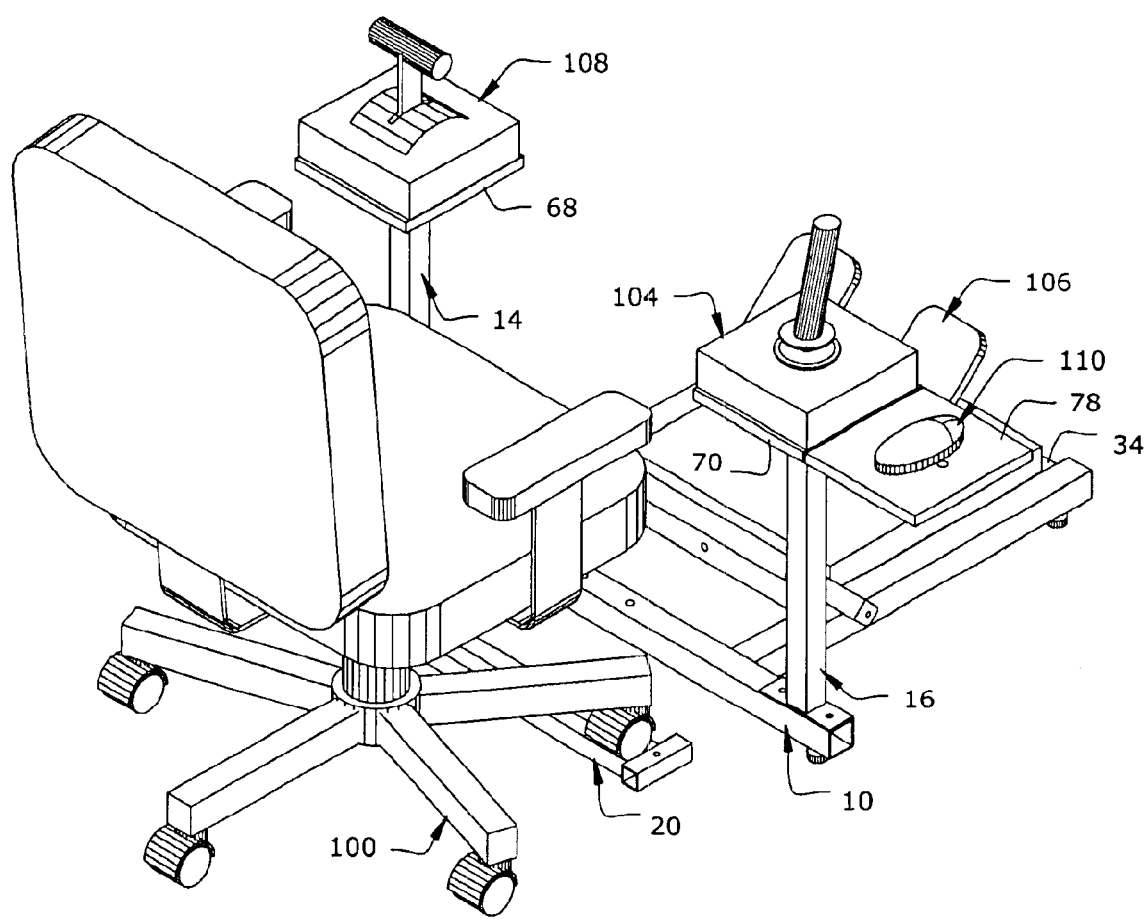
FIG. 6 shows a perspective view of a side stick aircraft configuration.

The side stick aircraft configuration is described in reference to FIG. 6. This configuration is found in modern fly-by-wire fighter type aircraft. The rudder controller 106 is placed on the pedal platform 34 as mentioned in the description of FIG. 4. The left side support assembly 14 is fastened to the base assembly 10 as shown in FIG. 9A. The throttle controller 108 is placed on the left side platform 68 and fastened with the mounting option as shown in FIG. 9H or 9I. The left side platform 68 is mounted for a quick change as shown in FIG. 9D. The right side support assembly 16 is fastened to the base assembly 10 as shown in FIG. 9A. A joystick 104 is placed on the right side platform 70 and fastened with the mounting option as shown in FIG. 9H or 9I. The right side platform 70 is mounted for a quick change as shown in FIG. 9E. The GUI pointing device 110 is placed on the GUI pointing device platform 78. The GUI pointing device platform 78 is mounted for quick change as shown in FIG. 9C. If necessary, the chair 100 is placed in the seat chock assembly 20 as mentioned in the description of FIG. 4.

Figure 7:
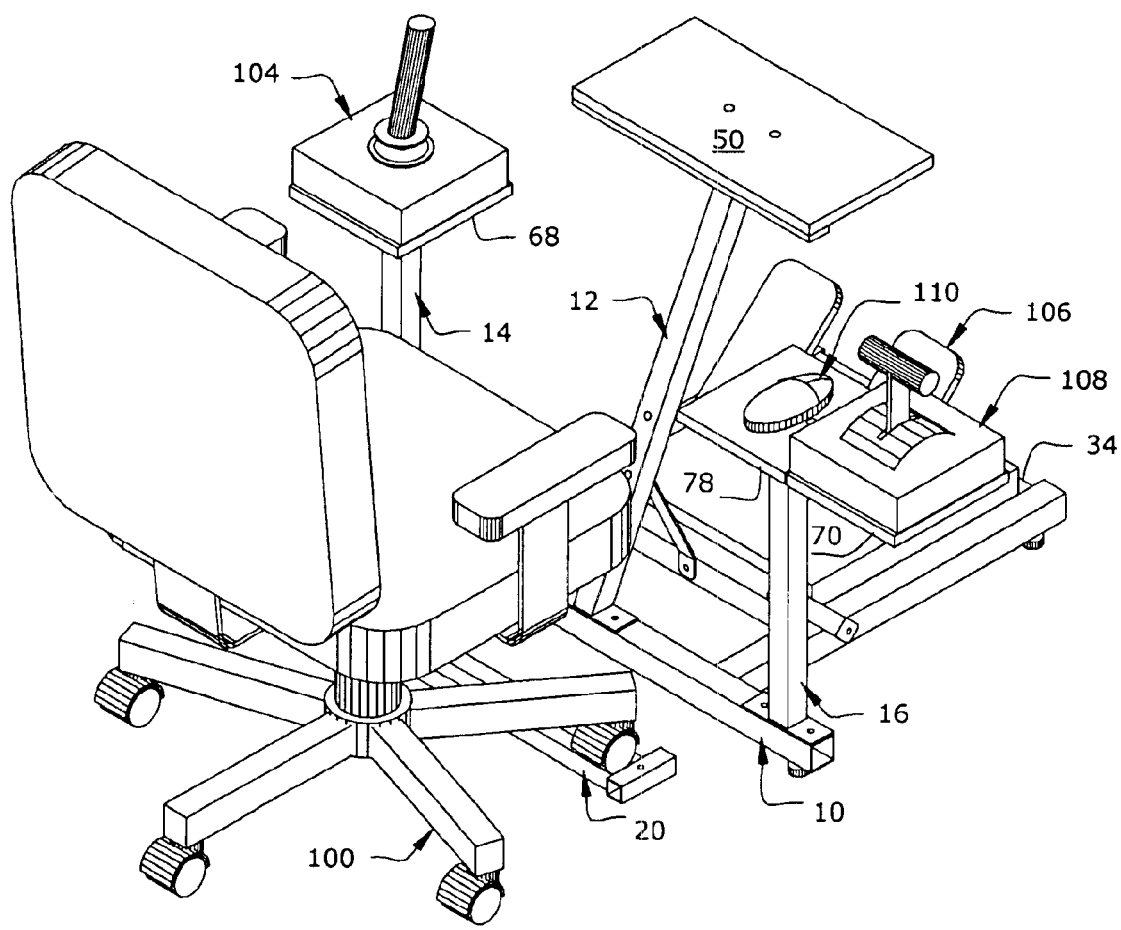
FIG. 7 shows a perspective view of a transport category aircraft side stick configuration.

The transport category aircraft side stick configuration is described in reference to FIG. 7. This configuration is found in modern fly-by-wire transport category aircraft. The rudder controller 106 is placed on the pedals platform 34 as mentioned in the description of FIG. 4. The center support assembly 12 is installed on the base assembly 10 as shown in FIG. 9A. In this configuration, the center platform 50 is used as a chart table. The left side support assembly 14 is fastened to the base assembly 10 as shown in FIG. 9A. The joystick controller 104 is placed on the left side platform 68 and fastened with the mounting option as shown in FIG. 9H or FIG. 9I. The left side platform 68 is mounted for a quick change as shown in FIG. 9D. In addition the right support assembly 16 is installed on the base assembly 10 as shown in FIG. 9A. The GUI pointing device 110 is placed on the GUI pointing device platform 78 for data entry. The GUI pointing device platform 78 is mounted for a quick change as shown in FIG. 9F. The throttle controller 108 is placed on the right side platform 70 and fastened with the mounting option as shown in FIG. 9H or 9I. The right side platform 70 is mounted for a quick change as shown in FIG. 9D. For simulation of the right pilot position, the left side post platform 68 with the joystick controller 104 can be mirror reversed to the right side. In this case, the GUI pointing device platform 78, the GUI pointing device 110, the right side platform 70, and the throttle controller 108 are moved to the left side. If necessary, the chair 100 is placed on the seat chock assembly 20 as mentioned in the description of FIG. 4

Figure 8:
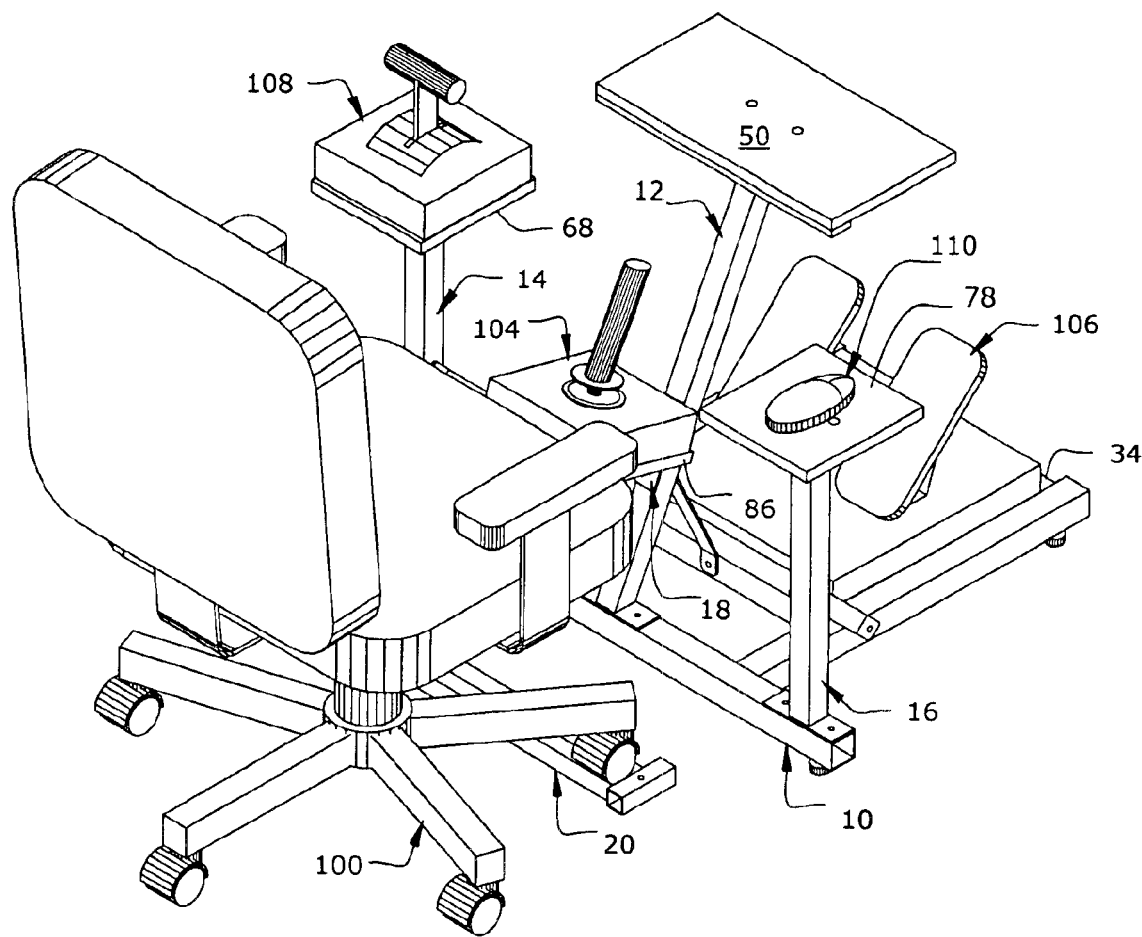
FIG. 8 shows a perspective view of a traditional center stick configuration.

The traditional center stick aircraft configuration is described with reference to FIG. 8. This configuration has been used since the beginning of aviation on light aircraft, and it is particular suited to aerobatic and fighter airplanes and therefore still found in current manufactured aircraft. The rudder controller 106 is placed on the pedals platform 34 as mentioned in the description of FIG. 4. The center support assembly 12 is installed on the base assembly 10 as shown in FIG. 9A. In this configuration, the center platform 50 can be used as a chart table. The center stick support assembly 18 is mounted for a quick change to the center support assembly 12 as shown in FIG. 9G. The joystick controller 104 is placed on the center stick platform 86 and fastened with the mounting option as shown in FIG. 9H or FIG. 9I. The center stick platform 86 is mounted for a quick change as shown in FIG. 9D. The left side support assembly 14 is fastened to the base assembly 10 as shown in FIG. 9A. The throttle controller 108 is placed on the left side platform 68 and fastened with the mounting option as shown in FIG. 9H or FIG. 9I. The left side platform 68 is mounted for a quick change as shown in FIG. 9D. The right side support assembly 16 is fastened to the base assembly 10 as shown in FIG. 9A. The GUI pointing device platform 78 is mounted for quick change as shown in FIG. 9C. The GUI pointing device 110 is placed on the GUI pointing device platform 78. If necessary, the chair 100 is placed on the seat chock assembly 20 as mentioned in the description of FIG. 4.

FIG. 9A is a sectional view showing the fastening detail using a rivet nut 120. The rivet nut 120 is installed into the square metal tubing 118. A metal flange 116 is fastened by means of a round head machine screw 122 and a lock washer 124 to the square metal tubing 118.

FIG. 9B is a sectional view showing the fastening detail of the pedals platform 34. The pedals platform 34 is fastened by means of a wood screw 114 to a pedals rail 112.

FIG. 9C is a sectional view showing the fastening detail using a counter-sunk screw 130 and a wing nut 132. The platform 126 is fastened to a platform flange/auxiliary support 128 by means of the counter-sunk machine screw 130 and the wing nut 132.

FIG. 9D is a sectional view showing the fastening detail using a T-nut 134 and a knob screw 136. The platform 126 is fastened to the platform flange/auxiliary support 128 by means of the T-nut 134 and the knob screw 136.

FIG. 9E is a sectional view showing the fastening detail with the auxiliary support 76 using the T-nut 134 and a knob screw 136. The platform 126 and the auxiliary support 76 are fastened to a platform flange 138 by means of the T-nut 134 and the knob screw 136.

FIG. 9F is a sectional view showing the fastening detail with the auxiliary support 76 using the counter-sunk screw 130 and the wing nut 132. The platform 126 and the auxiliary support 76 is fastened to the platform flange 138 by means of a counter-sunk machine screw 130 and a wing nut 132.

FIG. 9G is a sectional view showing the fastening detail using the rivet nut 120 and the knob screw 136. The rivet nut 120 is installed in the center post 44. The center stick support flange 80 is fastened with the knob screw 136.

FIG. 9H is an elevation view showing the fastening detail of a controller device without fastening holes 140. The controller device without fastening holes 140 is mounted to the platform 126 using a nylon cable tie 142.

FIG. 9I is an elevation view showing the fastening detail of a controller device with fastening slots or holes 144. The controller device with fastening slots or holes 144 is mounted to the platform 126 using the wood screws 114.

FIG. 9J is an elevation view from the front, showing the fastening of the seat chock assembly 20. A left chain assembly 96 and a right chain assembly 98 are fastened to the chair 100 using the existing screws and holes in the frame. The seat is lowered to its' lowest position. The chain assembly 96 and chain assembly 98 are crossed and fastened to the seat chock assembly 20. Turnbuckles included in the chain assemblies are used to tighten the chains to prevent the seat/chair 100 from swiveling. Straps and buckles can be used instead of the chain assemblies.

I claim:

1. A modular support frame for holding of control devices in various configurations used in computer flight simulation programs and other diverse games comprising:
    a base assembly including means for placing a rudder pedals controller;
    a center support assembly including means for mounting a yoke controller;
    and a means for joining the assemblies together;
whereby such control configuration represents a basic aircraft having a yoke controller with integrated throttles.

2. The support frame in claim 1 comprising:
    said base assembly including a pedals platform with a means for adjusting the longitudinal position, said pedals platform accommodating said rudder pedals controller thereon;
    said center support assembly installed at an angle to the vertical on said base assembly, said center support assembly including a center platform fastened on the top end, allowing the mounting of said yoke controller thereon;
    and a plurality of fasteners to join the parts together.

3. The support frame in claim 1 comprising:
    said base assembly including a pedals platform with a means for adjusting the longitudinal position, said pedals platform accommodating a vehicle pedals controller thereon;
    said center support assembly installed at an angle to the vertical on said base assembly, said center support assembly including a center platform fastened on the top end, allowing the mounting of a steering wheel controller thereon;
    and a plurality of fasteners to join the parts together.

4. The support frame in claim 1 comprising:
    a right side support assembly including means for mounting of a throttle controller;
whereby such control configuration represents a traditional transport category aircraft.

5. The support frame in claim 4 comprising:
    said right side support assembly is installed on said base assembly, said right side support assembly includes an auxiliary support mounted horizontally at the top portion, a right platform is fastened on the top of and the right side of said auxiliary support, said right platform allowing the mounting of said throttle controller thereon.

6. The support frame in claim 5 comprising:
    a graphic user interface pointing device platform is mounted on top of and the left side of said auxiliary support, said graphic user interface pointing device platform accommodating a graphic user interface pointing device.

7. The support frame in claim 6 further comprising:
    whereby said right side support assembly, including said auxiliary support, said right platform, said graphic user interface pointing device platform, said graphic user interface pointing device and said throttle can be moved to the left side of said base assembly in a mirror like fashion;
whereby such control configuration represents the right hand pilot station.

8. A modular support frame for holding of control devices in various cockpit configurations used in computer flight simulation programs and other diverse games comprising:
    a base assembly including means for placing a rudder controller;
    a left side support assembly including means for mounting a throttle controller;
    a right side support assembly including a means for mounting a joystick controller;
    and a means of joining the assemblies together;
whereby such control configuration represents a side stick fly-by-wire fighter type aircraft.

9. The support frame in claim 8 comprising:
    said base assembly including a pedals platform with a means for adjusting the longitudinal position, said pedals platform accommodating said rudder pedals thereon;
    said left side support assembly installed on said base assembly, includes a left platform fastened on the top end allowing the mounting of said throttle controller thereon;
    said right side support assembly installed on said base assembly, includes a right platform fastened on the top end allowing the mounting of said joystick controller thereon;
    and a plurality of fasteners to join the parts together.

10. The support frame in claim 9 further comprising:
    an auxiliary support included in said right side support assembly, said auxiliary support mounted horizontally beneath said right platform, providing a means for mounting a graphic user interface platform which can accommodate a graphic user interface pointing device adjacent to the right side of said joystick controller.

11. A modular support frame for holding of control devices in various cockpit configurations used in computer flight simulation programs and other diverse games comprising:

a base assembly including means for placing a rudder pedals controller;

a center support assembly including means for usage as a chart table;

a left side support assembly including means for mounting a joystick controller;

a right side support assembly including means for mounting a throttle controller;

and a means of joining the assemblies together;

whereby such control configuration represents a side stick fly-by-wire transport category aircraft.

12. The support frame in claim 11 comprising:

said base assembly including a pedals platform with a means for adjusting the longitudinal position, said pedals platform accommodating said rudder pedals controller thereon;

said center support assembly installed at an angle to the vertical on said base assembly, said center support assembly includes a chart table fastened at the top end;

said left side support assembly installed on said base assembly, includes a left platform fastened on the top end allowing the mounting of said joystick controller thereon;

said right side support assembly is installed on said base assembly, said right side support assembly includes an auxiliary support mounted horizontally at the top portion, a right platform is fastened on the top of and the right side of said auxiliary support, said right platform allowing the mounting of said throttle controller thereon;

and a plurality of fasteners to join the parts together.

13. The support frame in claim 12 comprising:

a graphic user interface pointing device platform mounted on top of and the left side of said auxiliary support, said graphic user interface pointing device platform accommodating a graphic user interface device.

14. The support frame in claim 13 further comprising:

whereby said left platform, said joystick controller, said auxiliary support, said graphic user interface pointing device platform, said graphic user interface pointing device, said right platform and said throttle controller can be moved to the opposite sides in a mirror like fashion; whereby such configuration represents the right hand pilot station.

15. A modular support frame for holding of control devices in various cockpit configurations used in computer flight simulation programs and other diverse games comprising:

a base assembly including means for placing a rudder pedals controller;

a center support assembly including means for usage as a chart table;

a center stick support assembly including means for mounting a joystick controller;

a left side support assembly including means for mounting a throttle controller, and a means for joining the assemblies together;

whereby such control configuration represents a center stick aircraft.

16. The support frame in claim 15 comprising:

said base assembly including a pedals platform with a means for adjusting the longitudinal position, said pedals platform accommodating said rudder pedals controller thereon;

said center support assembly installed at an angle to the vertical on said base assembly, said center support assembly includes a chart table fastened on the top end;

said center stick support assembly, attached to said center support assembly at a height and angle to accept a center stick platform so as to fit under the thighs of a sitting user, said center stick platform having said joystick controller mounted thereon, whereby the stick portion of said joystick controller is located between the users legs;

said left side support assembly installed on said base assembly, includes a left platform fastened on the top end allowing the mounting of said throttle controller thereon;

and a plurality of fasteners to join the parts together.

17. The support frame in claim 16 further comprising:

a right side support assembly installed on said base assembly, said right support assembly including a graphic user interface pointing device platform fastened on the top end to accommodate a graphic user interface device.

18. A modular support frame for holding of control devices in various cockpit configurations used in flight simulation programs and other diverse games comprising:

a seat chock assembly with means for fixing in place a rolling chair;

and a fastening means for preventing said rolling chair from swiveling;

whereby such device allows the user to maintain a steady relationship with respect to control devices.

19. The support frame of claim 18 comprising:

a seat forward chock and seat aft chock made of an angle extrusion attached to a left chock brace and a right chock brace creating a space for two casters of a rolling chair to rest;

and wherein the fastening means comprises a left and right chain assembly fastened on the underside of the chair frame, and each said chain assembly is secured at an anchor hole of said brace on the opposite side respectively.

* * * * *